United States Patent Office 3,504,021
Patented Mar. 31, 1970

3,504,021
PROCESS FOR THE PREPARATION OF
ABSCISIN II
Donald L. Roberts, Robert A. Heckman, and Bonita P. Hege, Winston-Salem, N.C., assignors to R. J. Reynolds Tobacco Company, Winston-Salem, N.C., a corporation of New Jersey
No Drawing. Filed Nov. 2, 1966, Ser. No. 591,428
Int. Cl. C07c 51/00
U.S. Cl. 260—514    4 Claims

ABSTRACT OF THE DISCLOSURE

Synthesis of the plant abscission hormone, abscisin II, by treating α-ionylideneacetate esters with a tertiary alkyl chromate oxidizing agent followed by saponification.

---

This invention relates to a new method of synthesizing the plant abscission hormone, abscisin II.

As is known, the plant hormone abscisin II is an abscission-accelerating substance which can be isolated from young cotton fruits and sycamore leaves. Abscisin II chemically is 3-methyl-5-(1-hydroxy-4-oxo-2,6,6-trimethyl-2-cyclohexene - 1 - yl)-cis, trans-2,4-pentadienoic acid having the following structure:

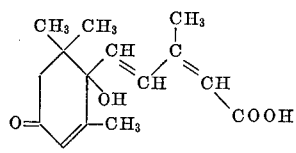

Synthetic production of this hormone is obviously desirable and the present invention provide a new synthetic method of producing this material.

The synthesis method of this invention involves treating α-ionylideneacetate esters with a tertiary alkyl chromate oxidizing agent followed by saponification to yield abscisin II. The synthesis can be represented by the following reaction scheme:

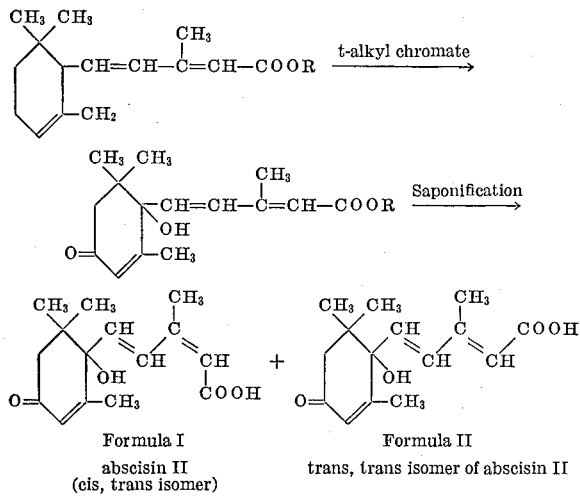

Formula I
abscisin II
(cis, trans isomer)

Formula II
trans, trans isomer of abscisin II

The α-ionylideneacetate esters which are employed in the synthesis are the lower alkyl esters of α-ionylideneacetic acid wherein R contains from 1 to 4 carbon atoms. The ratio of the cis,trans and trans,trans isomers of abscisin II depends upon the ratio of the corresponding isomers in the α-ionylideneacetate esters which are employed in the oxidation; if pure cis,trans isomers of α-ionylideneacetate esters are used, abscisin II is obtained as the sole product.

The tertiary alkyl chromate oxidizing agents which are employed are those containing from 4 to 6 carbon atoms in the alkyl group. If desired, these oxidizing agents can be formed in situ in the reaction by the use of chromium trioxide and a tertiary alkyl alcohol such as, for example, t-butyl alcohol, t-amyl alcohol and 2,3-dimethyl-2,3-butanediol. An excess of the tertiary alkyl chromate oxidizing agents is preferably employed, such as from 2 to 5 moles per mole of the α-ionylideneacetate ester. The oxidation of the α-ionylideneacetate esters is preferably carried out at an elevated temperature such as from about 60 to 120° C. for a period sufficient to accomplish oxidation, generally a period from about 1 to 24 hours.

The ionylideneacetate esters can be prepared from α-ionone according to methods known in the art such as, for example, by the methods described in J. Am. Chem. Soc., 77, 4111–4119 (1955) and also in Nippon Kagaku Zasshi, 79, 823–31 (1958).

The following examples illustrate the synthesis method of the present invention.

EXAMPLE I (a) Preparation of methyl α-ionylideneacetate

Trimethylphosphonoacetate (50 g., 0.275 mole) was added dropwise to a slurry of 56% sodium hydride (13.2 g., 0.275 mole) in 500 milliliters of 1,2-dimethoxyethane at 20°. The mixture was stirred for one hour to allow for gas evolution. α-Ionone (48 g., 0.25 mole) was added dropwise and the mixture was heated under reflux for 3.5 hours. Water was then added and the mixture was extracted with ether. The dried ether solution was distilled and a 66.5% yield of methyl α-ionylideneacetate was obtained. The ester was identified by its infrared spectra.

(b) Oxidation of methyl α-ionylideneacetate

A solution of chromium trioxide (26.8 g., 0.268 mole) in 100 milliliters of t-butyl alcohol containing 25 milliliters of acetic anhydride was added to methyl α-ionylideneacetate (16.6 g., 0.063 mole) in 100 milliliters of t-butyl alcohol at 100°. The solution was refluxed for five hours, the residue was diluted with water, oxalic acid was added, and the solution extracted with ether. A total of 15 grams of crude product was obtained. The sample was chromatographed, and the products were eluted from silicil acid with ether-pentane solutions. One gram of a mixture of cis,trans and trans,trans of methyl 3-methyl-5-(1-hydroxy-4- keto-2,6,6-trimethyl - 2 - cyclohexene-1-yl)-2,4-pentadienoate was isolated. Saponification of this fraction with 10% sodium hydroxide in methanol yielded abscisin II and its trans,trans-isomer.

EXAMPLE II t-Butyl chromate, prepared from 50 grams of chromium trioxide in 200 milliliters of tertiary butyl alcohol, was added with stirring to 26.2 grams (0.1 mole) methyl α-ionylideneacetate in 150 milliliters of t-butyl alcohol at 100°. The solution was heated under reflux for seven hours. The reaction mixture was then diluted with water and oxalic acid was added. The solution was extracted with ether; the ether solution was washed with sodium carbonate and dried over sodium sulfate. Sixteen grams of crude products were obtained.

The sample was chromatographed over silicic acid and yielded 4.0 grams of starting material and 2.0 grams of methyl 1-hydroxy-4-keto-α-ionylideneacetate. This ester was saponified with 10% sodium hydroxide in methanol to yield abscisin II and its trans,trans-isomer.

EXAMPLE III

Twenty-five grams of ethyl α-ionylideneacetate were added to t-butyl chromate prepared from 50 grams of chromium trioxide, 125 milliliters of tertiary butyl alcohol, and 25 milliliters of acetic anhydride. The solution was refluxed for 2½ hours and then worked up as described in the previous procedure; 20.5 grams of crude products were obtained in this reaction. The sample was chromatographed on silicic acid and approximately 1 gram of ethyl 1-hydroxy-4-keto-α-ionylidene acetate was obtained. This ester was saponified with 10% sodium hydroxide in methanol to yield abscisin II and its trans-trans-isomer.

It will be appreciated by those skilled in the art that various agents can be employed in the saponification step of the herein described synthesis. For example, agents such as sodium hydroxide, potassium hydroxide, sodium ethoxide, potassium t-butoxide and the like can be employed to saponify the esters.

The abscisin II isomers (Formula I and Formula II) can be separated by slow crystallization from ether or benzene; abscisin II is the least soluble and crystallizes from ether in high purity.

Those modifications and equivalents which fall within the spirit of the invention and the scope of the appended claims are to be considered part of the invention.

We claim:
1. A process which comprises treating a lower alkyl ester of α-ionylideneacetic acid with a tertiary alkyl chromate oxidizing agent and saponifying the oxidized reaction product to yield 3-methyl-5-(1-hydroxy - 4 - oxo-2,6,6-trimethyl-2-cyclohexene - 1 - yl)-cis,trans-2,4-pentadienoic acid.
2. The process of claim 1 wherein treatment of the lower alkyl ester of α-ionylideneacetic acid with a tertiary alkyl chromate oxidizing agent is carried out at a temperature in the range of about 60 to about 120°.
3. The process of claim 1 wherein a methyl ester of α-ionylideneacetic acid is employed.
4. The process of claim 1 wherein the ethyl ester of α-ionylideneacetic acid is employed.

References Cited

Nature, vol. 206, May 15, 1965.
Agr. Biol. Chem. vol. 29 (10) October 1965.

JAMES A. PATTEN, Primary Examiner

PAUL J. KILLOS, Assistant Examiner

U.S. Cl. X.R.

260—468